US011260986B2

(12) United States Patent
Garcia Martinez et al.

(10) Patent No.: US 11,260,986 B2
(45) Date of Patent: Mar. 1, 2022

(54) METHOD AND DEVICE FOR INSPECTING THE DAMAGE TO THE SKIN OF AN AEROPLANE AFTER A LIGHTNING STRIKE

(71) Applicants: AIRBUS OPERATIONS S.L., Getafe (ES); AIRBUS OPERATIONS (S.A.S.), Toulouse (FR); AIRBUS S.A.S., Blagnac (FR)

(72) Inventors: Valentin Garcia Martinez, Getafe (ES); Richard Murillo, Toulouse (FR); Sebastien Dupouy, Blagnac (FR); Antoine Bregand, Toulouse (FR); Irene Borillo Llorca, Getafe (ES); Romain Coëmet, Toulouse (FR)

(73) Assignees: Airbus Operations S.L., Getate (ES); Airbus Operations (S.A.S), Toulouse (FR); Airbus S.A.S., Blagnac (FR)

( * ) Notice: Subject to any disclaimer, the term of this patent is extended or adjusted under 35 U.S.C. 154(b) by 419 days.

(21) Appl. No.: 16/319,104

(22) PCT Filed: Jun. 29, 2017

(86) PCT No.: PCT/ES2017/070475
§ 371 (c)(1),
(2) Date: Jan. 18, 2019

(87) PCT Pub. No.: WO2018/015592
PCT Pub. Date: Jan. 25, 2018

(65) Prior Publication Data
US 2019/0263535 A1    Aug. 29, 2019

(30) Foreign Application Priority Data
Jul. 18, 2016  (EP) .................................. 16382343

(51) Int. Cl.
*B64D 45/02* (2006.01)
*B64F 5/60* (2017.01)
(Continued)

(52) U.S. Cl.
CPC ................ *B64D 45/02* (2013.01); *B64F 5/40* (2017.01); *B64F 5/60* (2017.01); *G06Q 10/20* (2013.01);
(Continued)

(58) Field of Classification Search
CPC ...... G07C 5/0808; G06Q 10/20; B64D 45/02; B64D 2045/0085; B64F 5/60; B64F 5/40; B64C 1/12
See application file for complete search history.

(56) References Cited

U.S. PATENT DOCUMENTS 9,217,811 B1*  12/2015  Sweers .................... B64F 5/00
2008/0270052 A1*  10/2008  Bernus .................. H01Q 1/425
702/65

(Continued)

FOREIGN PATENT DOCUMENTS

EP          2 664 548        11/2013

OTHER PUBLICATIONS

International Search Report for PCT/ES2017/070475 dated Nov. 23, 2017, 6 pages.
(Continued)

*Primary Examiner* — Peter D Nolan
*Assistant Examiner* — Demetra R Smith-Stewart
(74) *Attorney, Agent, or Firm* — Nixon & Vanderhye P.C.

(57) ABSTRACT

A method and device for inspecting the structural damage on the skin of an aircraft after a lightning strike, the skin has marks derived from the lightning strike, wherein the marks represent a Visual Damage (VD) and a Structural Damage (SD). The method includes for every mark: measuring the
(Continued)

area of paint that has been removed by the lightning strike, and comparing the measured area with an area threshold value, wherein the threshold value is related to the Structural Damage (SD) of every mark.

11 Claims, 14 Drawing Sheets

(51) Int. Cl.
    *B64F 5/40*     (2017.01)
    *G07C 5/08*     (2006.01)
    *G06Q 10/00*     (2012.01)
    *B64C 1/12*     (2006.01)
    *B64D 45/00*     (2006.01)

(52) U.S. Cl.
    CPC ............ *G07C 5/0808* (2013.01); *B64C 1/12* (2013.01); *B64D 2045/0085* (2013.01)

(56) References Cited

U.S. PATENT DOCUMENTS

| | | | |
|---|---|---|---|
| 2009/0237272 A1* | 9/2009 | Georgeson | B64D 45/02 340/945 |
| 2015/0185128 A1* | 7/2015 | Chang | G07C 5/006 702/35 |
| 2016/0077027 A1* | 3/2016 | Sweers | B29C 66/45 324/654 |
| 2016/0185469 A1* | 6/2016 | Ujita | G01N 21/8806 348/129 |
| 2017/0315072 A1* | 11/2017 | Georgeson | G01N 25/72 |
| 2018/0118375 A1* | 5/2018 | Lin | G06Q 10/20 |

OTHER PUBLICATIONS

Feraboli et al., "Damage of Carbon/Epoxy Composite Plates Subjected to Mechanical Impact and Simulated Lightning", *Journal of Aircraft*, vol. 47, No. 3, May 1, 2010, pp. 999-1012.

\* cited by examiner

METHOD AND DEVICE FOR INSPECTING THE DAMAGE TO THE SKIN OF AN AEROPLANE AFTER A LIGHTNING STRIKE

RELATED APPLICATIONS

This application is the U.S. national phase of International Application PCT/ES2017/070475 filed Jun. 29, 2017, which designated the U.S. and claims priority to European Patent Application No. 16382343.8 filed Jul. 18, 2016, the entire contents of each of which are hereby incorporated by reference.

FIELD OF THE INVENTION

The present invention refers to a method and a device for aircraft damage inspection after a lightning strike by getting an optimized admissible visual damage determined by the relationship between the structural damage and the visual damage produced by a certain lightning strike energy.

BACKGROUND OF THE INVENTION

Lightning strikes can affect airline operations causing costly delays and service interruptions. When commercial aircraft are struck by lightning, the result can range from no damage to severe damage which may require immediate repair that can take the aircraft out of service for an extended period of time. The severity of the damage varies greatly and is dependent on multiple factors such as the energy level of the lightning strike.

Lightning initially attaches to an aircraft extremity at one spot and exits from another. Due to the relative speed of the aircraft to the lightning channel, there may be several additional attachment points between those initial and exit points (swept stroke), this may lead to up to hundreds of marks spread out all along the skin of the aircraft.

The direct effects of a lightning strike are the damages caused to the structure which include melt through, pitting to the structure, burn marks around fasteners and burnt paint for metallic structures. In the case of composite structures, apart from burnt paint, damaged fibers and delaminations can be found.

At each attachment point of the lightning arc, the damage on a composite component can be separated into two parts:
  Firstly, at the exterior surface of the fuselage burn marks and missing paint are visible and quantifiable.
  Secondly, inside the composite material, structural damages as overheating of the resin, broken fibers and delamination can be found.

Some zones of the aircraft are more prone to lightning strikes than others. It is already known and standardized that the aircraft can be divided into several zones regarding the probability of receiving a lightning strike:
  Zone 1—High probability of initial lightning strike attachment (entry or exit).
  Zone 2—High probability of a lightning strike being swept from a point of initial attachment.
  Zone 3—Any aircraft surface other than those covered by zones 1 and 2.

At each zone, a maximum energy level of the strike is expected according to existing standards, for instance, Eurocae ED-91 & ED-84.

When the aircraft is back on the ground after being struck, the severity of the damage shall be assessed and, depending on the size of the damages, some maintenance operations (repairs, inspection of areas, etc.) can be necessary.

In CFRP (Carbon-fiber-reinforced polymer) structures, it is well known that delamination damages can be greater than the external observed damage (the visual damage), reason why, with the current state of the art, an inspection with a device capable of detecting damage within the structure is required; typically these test devices use ultrasound, X-ray or thermography. The inspection is performed mark by mark spending between five to ten minutes at each mark; therefore, in a case when there are substantial lightning attachment points (swept stroke), the time associated to those inspections at each mark may require the aircraft to be on ground for a significant time, putting in risk the daily operations of the airline/air carrier. Thus the inspection of the aircraft after a lightning strike is time consuming and can only be done by qualified operators.

SUMMARY OF THE INVENTION

The object of the invention is a method and a device for aircraft damage inspection after impact of a lightning strike based on an optimized admissible visual damage threshold.

After being struck by lightning, the CFRP skin comprises a set of visual marks. Some of them have both paint removed off and potential structural damage.

The inspection method, object of the invention, is based on the link of these two parameters:
  The Visual Damage (VD), which refers to the area wherein the paint has been scrapped off the CFRP skin by the lightning strike.
  The Structural Damage (SD) resulting from the lightning strike which refers to the damage on structural layers of the composite elements wherein laminate is effectively damaged.

A deep study on visual damage versus structural damage has been performed in the full range of both parameters in order to validate an aircraft release policy based on confidence of the predicted results.

This defined relationship enables the definition of the structural damage that can be expected for a given visual damage. The acceptance criteria (visual damage) must be defined in such a way that the impacted aircraft parts are able to sustain the level of structural loads that allow the continuous safe operation of the aircraft.

The method of inspection object of the invention allows determining a maximum visual damage for which it is assured that the structural damages associated to it are always below the defined limits. This admissible visual damage is referred as $VD_{ADL}$ from now on.

Relationship Between Visual Damage and Structural Damage

The relationship between visual damage and structural damage has not been studied either by the industry or the scientific community.

By choosing the right main parameter that drives the relationship and making some hypothesis, the invention develops a method to predict one of the parameters (VD or SD), when the other is given, with a defined confidence level. The conclusions of this method have been verified in a laboratory environment and in real flight conditions.

Primary Parameter.

Several parameters have an impact on the structural damage such as paint thickness, CFRP thickness, percentage of dielectric thickness of the CFRP, structural reinforcement, the peak current of the lightning, the energy injected by the lightning, or what is the same, the energy level of the lightning strike, etc. The parameter chosen as "primary" or "main" parameter has a critical importance, as it allows to find a dependency. Not all of the previous parameters have an influence or the same level of influence on the visual damage. In this case, after analyzing multiple parameters, the energy level of the lightning strike or the peak current of the lightning strike is chosen as the primary parameter.

Analyzing the empirical data, the existence of a monotonically increasing relationship between the average visual damage and the energy level of the lightning strike or the peak current, as well as between the average structural damage and the energy level or the peak current, is observed. This observation will be the base for establishing different conclusions for this method.

Assumption.

It is considered that the rest of aforementioned parameters (e.g. paint thickness, CFRP thickness, structural reinforcements) are less significant in comparison with the main parameter, assuming these parameters are within the threshold defined by the aircraft manufacturer (e.g. paint thickness may be limited by manufacturing processes, operational requirements and expectable damages). Therefore, these secondary parameters can be absorbed as part of the natural randomness that characterizes the lightning phenomenon.

An admissible Structural Damage (ADL) is provided for every component of the aircraft, i.e. for the aircraft zone in which the mark is located. Said admissible Structural Damage (ADL) is set according to the technical features of the material of the component and the structural loads the aircraft component will see during its lifetime.

The method object of the invention comprises the following steps:
  in every mark, measuring the area of paint that has been removed by the lightning strike (the Visual Damage),
  comparing the measured area with an area threshold value, wherein the threshold value is related to the Structural Damage (SD) of every mark and is obtained by the following steps:
    sorting empirical data of Structural Damage (SD) versus Visual Damage (VD) for different levels of energy of the lightning strike, the levels of energy being below a maximum energy expectable in the specific aircraft zone in which the mark is located,
    providing an admissible Structural Damage (ADL) for the aircraft zone in which the mark is located,
    calculating an admissible Visual Damage ($VD_{ADL}$) for which the maximum Structural Damage (SD) that can be encountered is less than the admissible structural damage (ADL) for the aircraft zone in which the mark is located, said optimized Visual Damage ($VD_{ADL}$) being the area threshold value.

Note the reduced complexity of the proposed method compared to the state of the art method. Time-consuming non-destructive tests are avoided; the operator just has to measure the visual damage caused by the lightning strike and compare it to an already calculated threshold value.

After choosing the primary parameter and setting the assumption, the following embodiments are developed to establish the method for calculating the admissible Visual Damage ($VD_{ADL}$):
  if the most energetic lightning strike expected in the specific aircraft zone in which the mark is located causes a Structural Damage (SD) lower than the provided admissible Structural Damage (ADL), a method called "Bounding-Box Approach" is used,
  if the most energetic lightning strike expected in the specific aircraft zone causes a Structural Damage (SD) higher than the provided admissible Structural Damage (ADL), a method called "Energy-Dependent Approach" is used.

Both methods determine an admissible Visual Damage ($VD_{ADL}$) for which the maximum Structural Damage (SD) that can be encountered is less than the Admissible Damage (ADL) for the skin zone in which the mark is located. Therefore, if damages caused by lightning strike are found during an inspection and the Visual Damage (VD) is smaller than admissible Visual Damage ($VD_{ADL}$), it is possible to ensure the continuous operation of the aircraft without performing any non-destructive test, saving time for the airline.

It is also an object of the present invention a device for inspecting the damage on the aircraft after a lightning strike. It comprises a characteristic area that is equal to a Visual Damage threshold value which is related to the Structural Damage and wherein the threshold value is calculated according to the previous method.

Said device allows a quick comparison of the Visual Damage of every mark by just locating the device over the mark. The advantage is that it provides even a quicker visual inspection that leads to a reduction of the time on ground of the aircraft.

With this method, most of the damages, wherein an inspection with an apparatus of ultrasounds, X-ray or thermography was needed, are now assessed only by visual inspection, saving hours and increasing the operability of the aircraft.

DESCRIPTION OF THE FIGURE

To complete the description and in order to provide for a better understanding of the invention, drawings are provided. Said drawings are an integral part of the description and illustrate preferred embodiments of the invention. The drawings comprise the following figures.

FIG. 1a represents the case when the method called "Bounding-Box Approach" must be applied (maximum Structural Damage (SD) expected in that aircraft zone is less than the admissible Structural Damage (ADL)). FIG. 1b represents the alternative case, when the method called "Energy-Dependent Approach" must be used (maximum Structural Damage (SD) expected in that aircraft zone is greater than the admissible Structural Damage (ADL)).

In FIG. 9b, the curve A represents the case when minimum Visual Damage ($VD_{min}$) is monotonically increasing with the energy, while curve B represents the case when it is not.

DETAILED DESCRIPTION OF THE INVENTION

Depending on the maximum lightning strike energy level expected in a defined aircraft zone and its relation to the admissible Structural Damage (ADL) applicable to that zone, two different embodiments for calculating the area of the Visual Damage are given (the Bounding-box approach and the Energy-dependent approach).

Method 1: Bounding-Box Approach

Figure 1A:
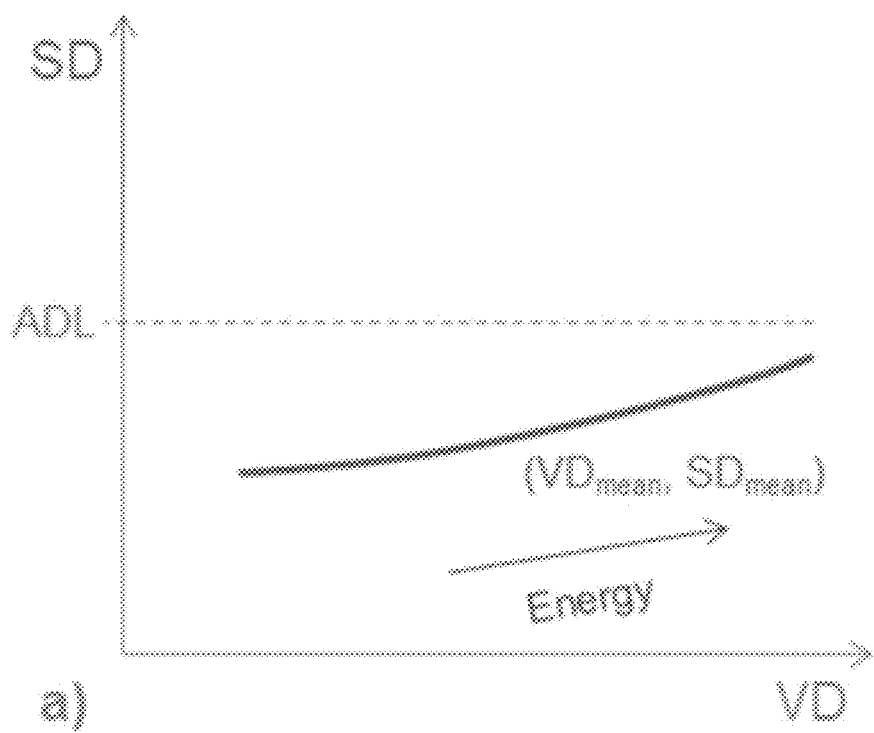
FIGS. 1a and 1b show graphics depicting the behavior of the Structural Damage (SD) and Visual Damage (VD) as the energy level of a lightning strike increases.

As previously stated, this embodiment is valid for cases when the admissible Structural Damage (ADL) of the aircraft zone in which the mark is located is above the Structural Damage (SD) associated to the maximum lightning strike energy level or peak current expected on the aircraft section studied, see FIG. 1a.

In this method a strong hypothesis is done: for the aforementioned maximum energy level, it is assumed that there is no relationship between the Visual Damage (VD) and the Structural Damage (SD), which leads to analyze Visual Damage (VD) and Structural Damage (SD) as statistically independent parameters. This hypothesis lies down on the assumption that, for an adequate number of specimens, as Visual Damage (VD) and Structural Damage (SD) have a monotonically increasing dependence with the energy and as the area under study is associated to the maximum foreseen energy, higher damages than the limits calculated are not expected.

Figure 3:
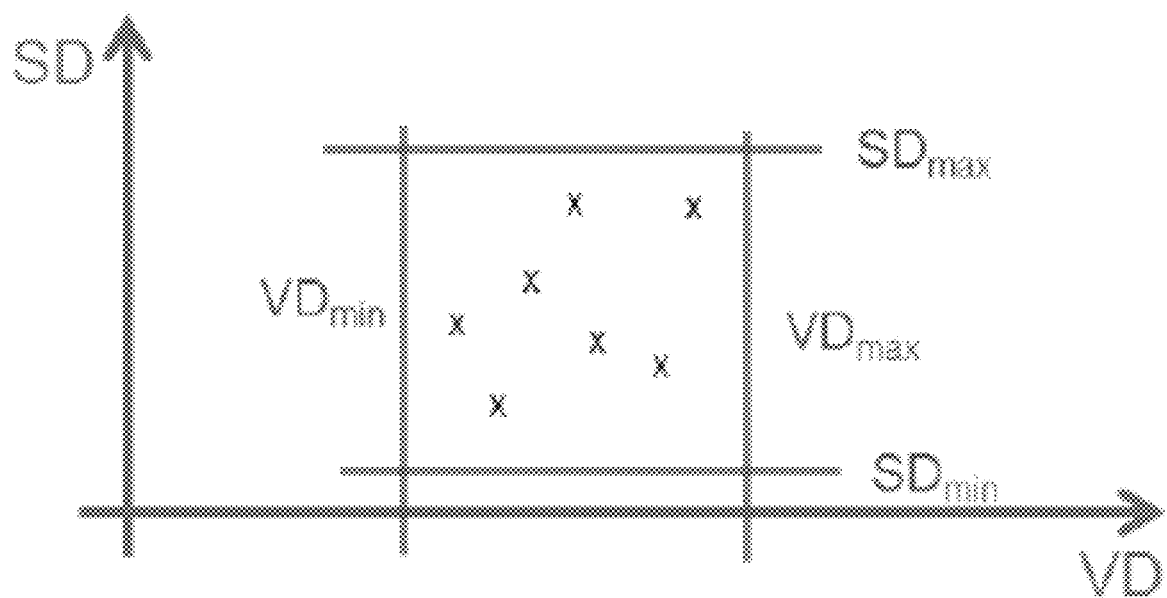
FIG. 3 shows a qualitative representation of the "Bounding-Box Approach".

The method comprises the following steps:
1) Sort the data by the primary parameter (i.e. energy level or peak current). The highest energy level tested corresponds to the most energetic lightning strike the aircraft skin zone in which the mark is located is going to experience.
2) Calculate the confidence interval of each type of damage for the highest energy level, taking into account the amount of specimens available for the study and the confidence level that wants to be achieved for each type of damage (VD, SD) independently. The calculated limits define a "bounding-box" where the data is confined, see FIG. 3.
3) The maximum Visual Damage ($VD_{max}$) determined by the confidence interval is the admissible Visual Damage ($VD_{ADL}$).

Figure 4:
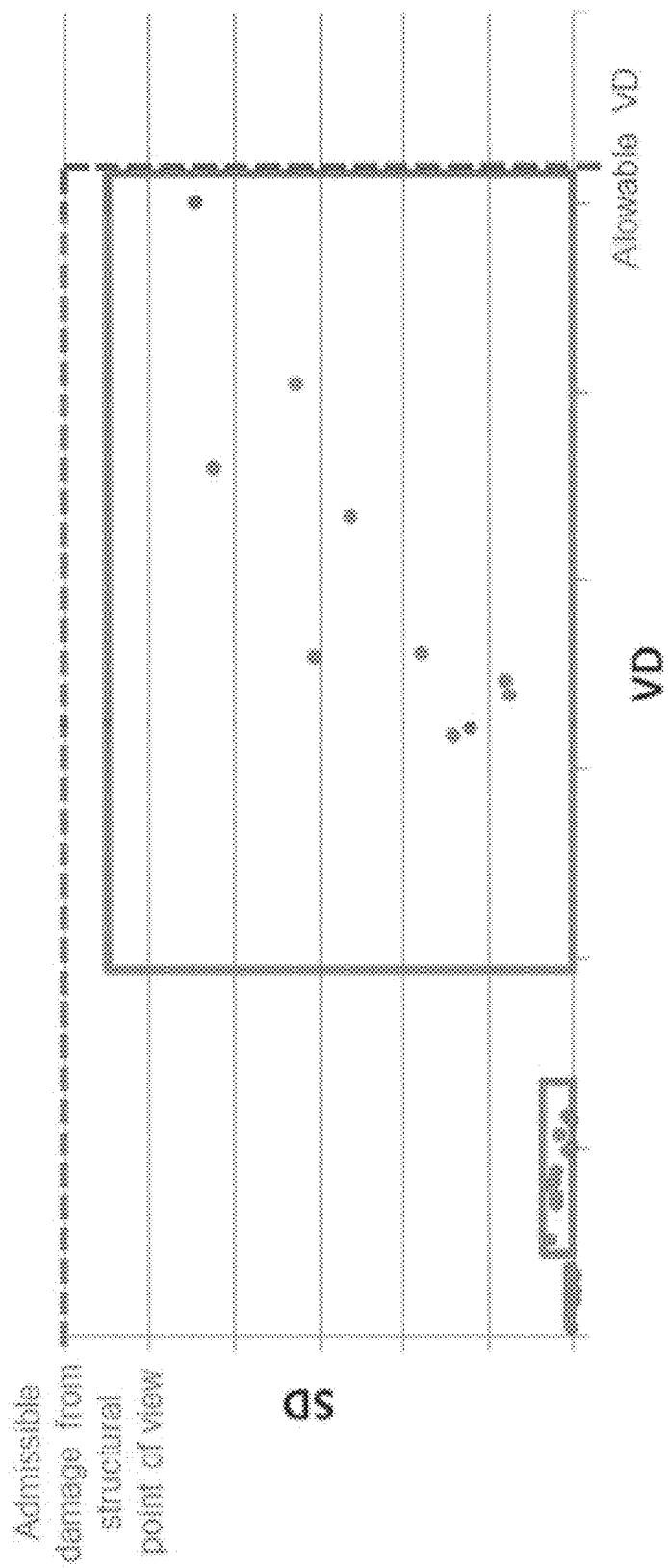
FIG. 4 shows the results obtained with the "Bounding-Box Approach" for a real example.

To verify said calculation, it must be ensured that the admissible structural damage (ADL) of the mark is higher or equal than the upper limit of the bounding box, i.e., than the maximum Structural Damage ($SD_{max}$). Hence, the admissible Visual Damage ($VD_{ADL}$) corresponds to the rightermost limit of the box ($VD_{max}$), see FIG. 4.

Method 2: Energy-Dependent Approach

Figure 1B:
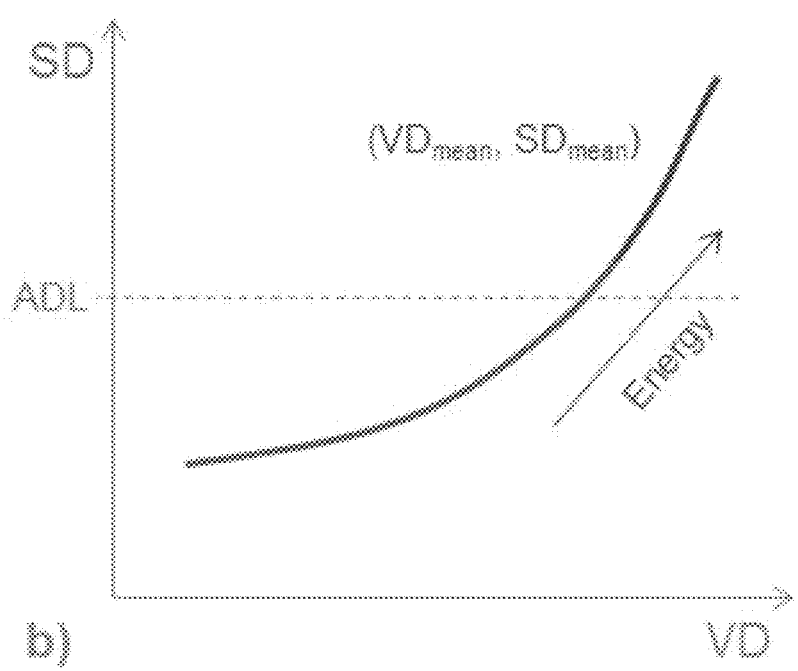
Figure 2:
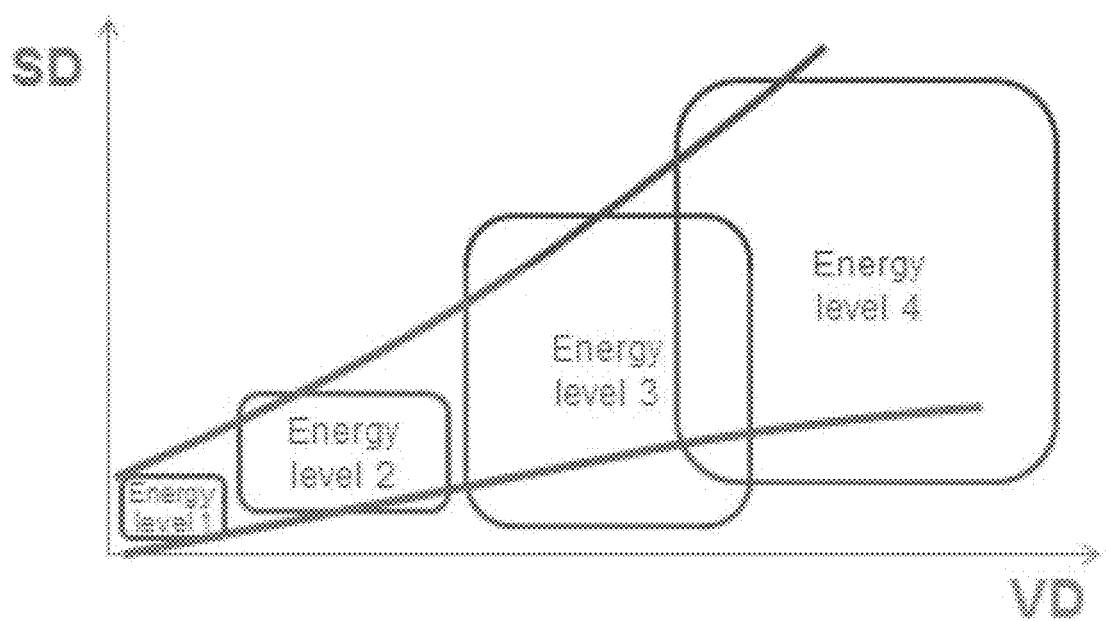
FIG. 2 shows the two different approaches that can be used to find the Visual Damage-Structural Damage (VD-SD) relationship. The rectangles represent the "Bounding-Box Approach" while the other increasing lines represent the "Energy-Dependent Approach". "Energy level 1" is the least energetic and "energy level 4" is the most energetic.

If the admissible Structural Damage (ADL) target is not associated to the maximum expected energy in the studied aircraft zone, see FIG. 1b, a second method is used to determine the admissible Visual Damage ($VD_{ADL}$).

With this method, it is possible to determine and validate the final admissible Visual Damage ($VD_{ADL}$) figure while minimizing the number of tests. Lightning strike testing is expensive; this approach allows:
(a) estimating the energy level that is in the acceptable range of Visual Damage (VD) for a defined admissible structural damage (ADL), thus reducing as much as possible the number of tests.
(b) Once the energies that must be tested are obtained, the admissible Visual Damage ($VD_{ADL}$) value can be determined.

As aforementioned, Visual Damage (VD) and Structural Damage (SD) follow in average a monotonically increasing dependence with the energy. From this it can be deducted that Visual Damage (VD) and Structural Damage (SD) also follow in average a monotonically increasing dependence, as the empirical data verify.

The idea behind this embodiment is to appropriately model this Structural Damage-Visual Damage (SD-VD) relationship across all different energy levels, as opposed to the first case, where the Visual Damage (VD) and Structural Damage (SD) were analyzed independently for the maximum energy level expected. A prediction confidence interval of the Structural Damage-Visual Damage (SD-VD) relationship is calculated.

Figure 5:
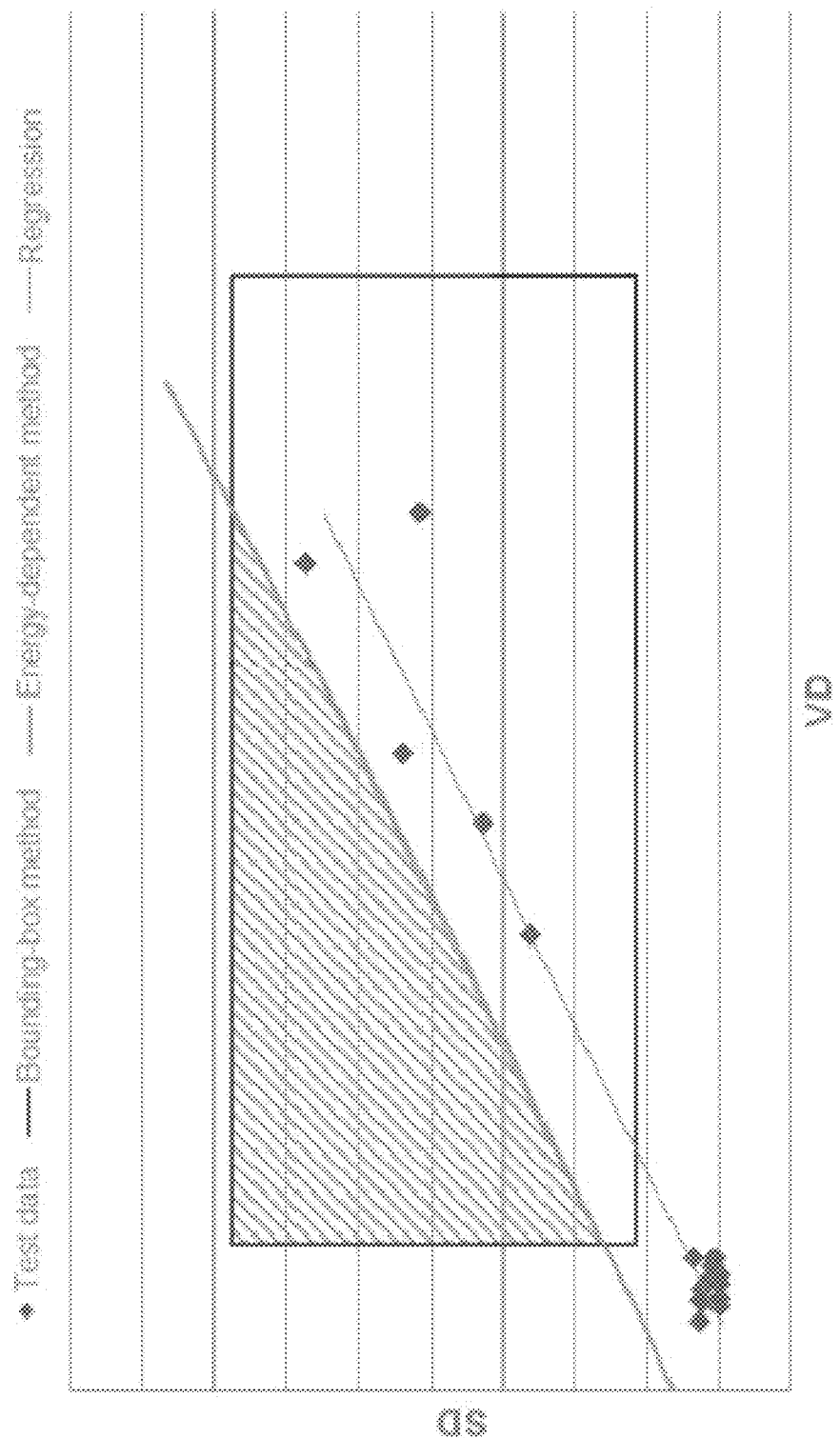
FIG. 5 shows a graphic depicting a comparison of qualitative results when applying the "Bounding-Box Approach" and the "Energy-Dependent Approach".

When analyzing the Structural Damage (SD) and Visual Damage (VD) parameters independently (embodiment 1) the independent predicted intervals are higher because not all the available information is used. Taking into account that Structural Damage (SD) and Visual Damage (VD) follow a monotonically increasing relationship allows discarding some areas (VD, SD); hence, the prediction interval is more precise. In FIG. 5, a comparison of qualitative results when applying the bounding-box method and the energy-dependent method reveals a shaded area that corresponds to the area that can be discarded when using the energy-dependent method, which represents better the underlying physics.

Figure 6:
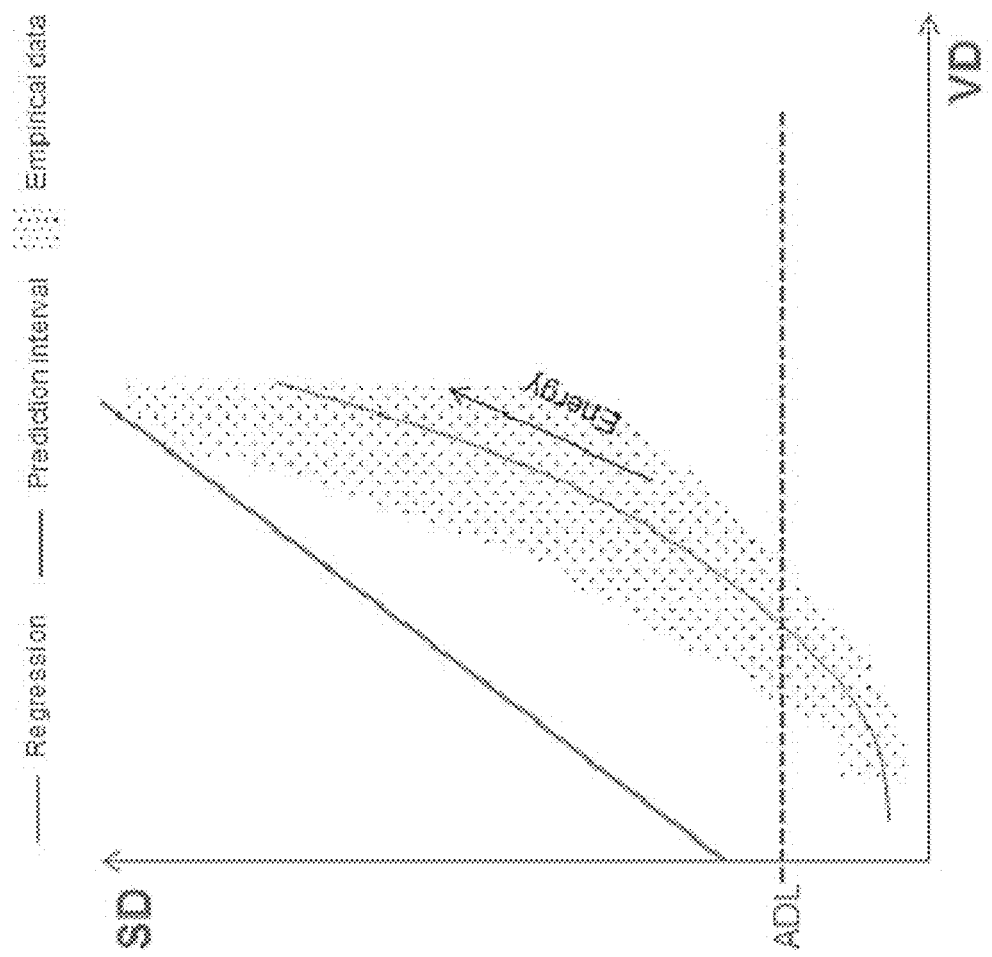
FIG. 6 shows a graphic depicting the nature of the Visual Damage-Structural Damage (VD-SD) relationship and compares it to the statistical method used.

In order to achieve the first goal (i.e., estimating the energy that must be tested for being in an acceptable range of Visual Damage (VD) and Structural Damage (SD)), the following issues need to be solved:
Previous empirical data demonstrate that the Visual Damage-Structural Damage (VD-SD) relationship is clearly exponential, see FIG. 6; as the energy increases, Structural Damage (SD) increases exponentially as well as its dispersion. It would be possible to accurately define this behavior with an extensive lightning strike test campaign, but this option is not feasible as it would imply a considerable financial impact.

To overcome this issue, a mathematical model needs to be used to determine a prediction interval for the Structural Damage (SD). Unfortunately, there is no existing model able to adapt to an exponential curve with exponential increase of dispersion; standard models are driven by the Structural Damage (SD) scatter of the maximum energy level included in the calculations. As a result, extremely high values of Structural Damage (SD) are predicted for the lower energy levels, giving useless results from an applied technological perspective. This is clearly a fault of the mathematical model as empirical data show that the limit predicted by the standard models is excessively conservative, see FIG. 6.

Figure 7B:
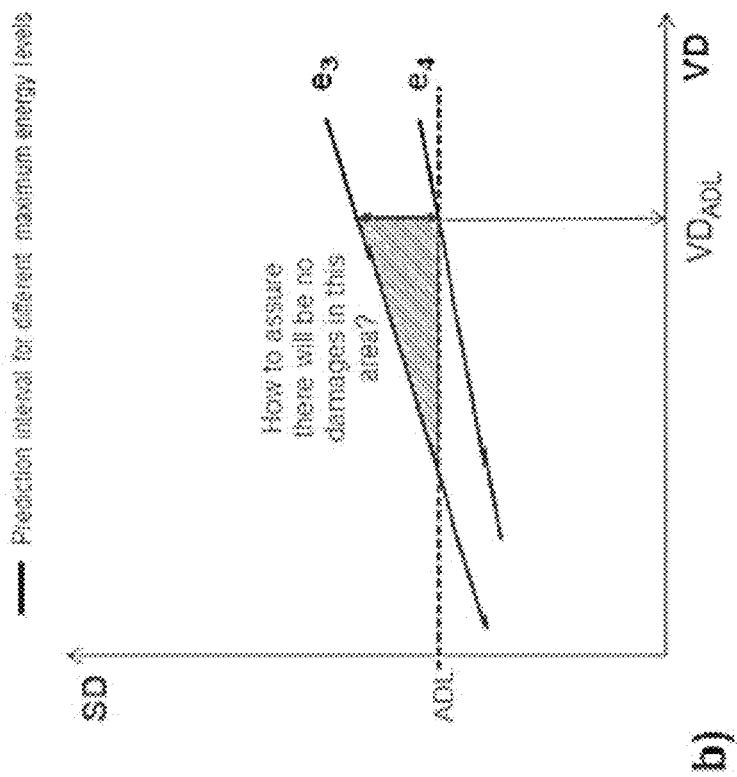
FIG. 7b highlights the possible problem of obtaining structural damages on areas which initially may thought to be safe due to the maximum energy level chosen.

As this method allows making estimations for lower energies, it must be assured that higher energy levels will not endanger the established allowable Visual Damage (VD): Structural Damages (SD) higher than the admissible structural damage (ADL) cannot be permitted for Visual Damages (VD) lower than the admissible Visual Damage ($VD_{ADL}$), see FIG. 7b, as this situation could lead to a safety issue.

To solve the aforementioned issues it is necessary to understand two relationships: the relationship between the Visual Damage (VD), the Structural Damage (SD) and the admissible structural damage (ADL); and the relationship between the Visual Damage (VD) and the energy level.

Figure 7A:
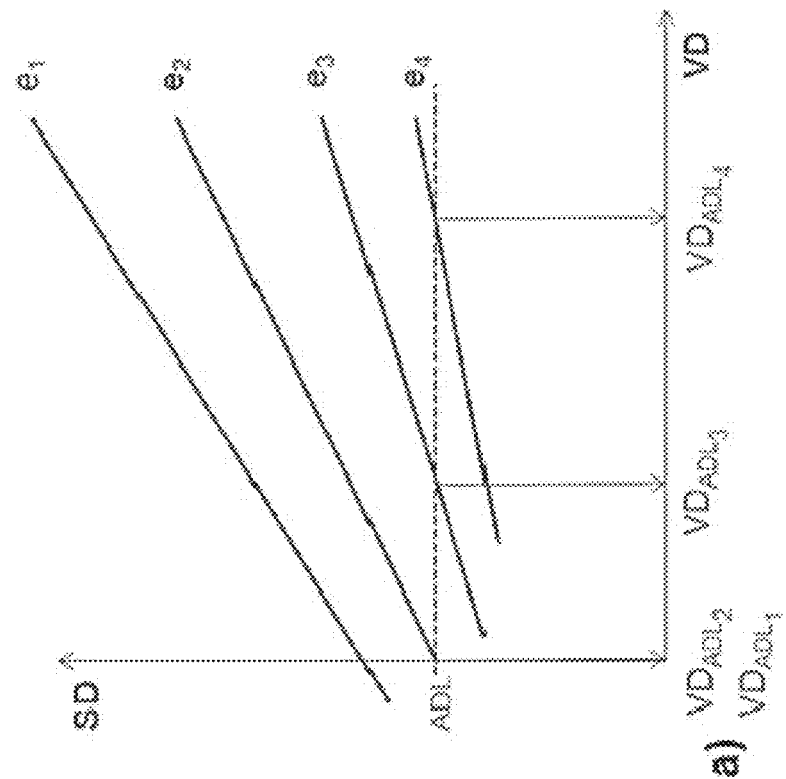
FIG. 7a shows graphics depicting the variation of Structural Damage (SD) prediction intervals with respect to the maximum energy level tested, being $e_1$ the highest energy level expected on a specific zone of the aircraft in which the mark is located and $e_4$ the lowest one.

Visual Damage-Structural Damage (VD-SD) relationship with the admissible structural damage (ADL):
a. When calculating prediction intervals, due to the exponential increase of the scatter with the energy (see FIG. 6), when taking into account higher energy levels, the prediction interval is dominated by the Structural Damage-Visual Damage (SD-VD) values of the highest energy level. See FIG. 7a; when adding higher energy levels to the calculations ($e_4 \rightarrow e_4+e_3 \rightarrow e_4+e_3+e_2 \rightarrow e_4+e_3+e_2+e_1$; being $e_i$ different energy levels where $e_4<e_3<e_2<e_1$), the Structural Damage (SD) prediction curve (the maximum values of Structural Damage (SD) predicted for a Visual Damage (VD) range) is modified as it is strongly influenced by the higher energy level.
b. See FIG. 7a. For the $e_1$ case, the prediction interval never intersects the admissible structural damage (ADL) line, hence, statistically, for any value of Visual Damage (VD), the Structural Damage (SD) obtained will be higher than the admissible structural damage (ADL).
c. See FIG. 7a. For the $e_3$ case (only energy levels $e_3$ and $e_a$ are taken into account) the prediction interval decreases as the scatter of damages associated to $e_3$ is lower than the one associated to $e_1$. Hence, the prediction interval intersects the admissible structural damage (ADL) line, allowing to define an admissible Visual Damage ($VD_{ADL3}$) that assures that for lower values of Visual Damages (VD), the Structural Damage (SD) will be lower than the admissible Structural Damage (ADL).
d. Consequently, the highest energy level taken into account for the statistical method will determine the admissible Visual Damage ($VD_{ADL}$). As the highest energy level decreases, the admissible Visual Damage ($VD_{ADL}$) will increase (i.e. $VD_{ADL1}<VD_{ADL2}<VD_{ADL3}<VD_{ADL4}$).
e. Therefore, different admissible Visual Damage ($VD_{ADL}$), which fulfil de condition of Structural Damage (SD)<admissible Structural Damage (ADL), can be defined for different energy levels.

Figure 8:
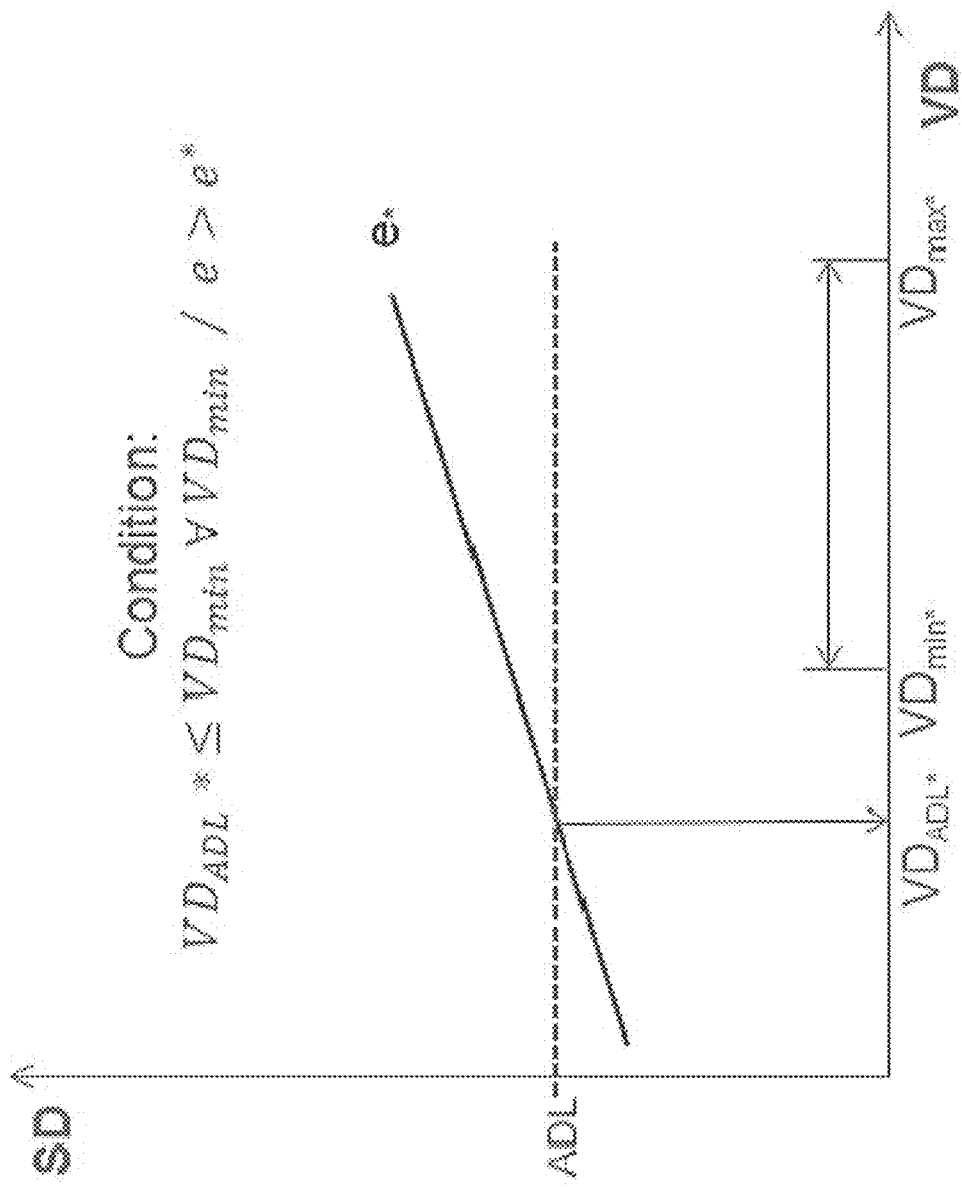
FIG. 8 shows a graphic depicting the energy level for calculating the admissible Visual Damage ($VD_{ADL}$), and the minimum and maximum Visual Damages ($VD_{min}$, $VD_{max}$) for said energy level.

Visual Damage (VD) relationship with the energy level:
a. Although there are different possible admissible Visual Damages ($VD_{ADL}$) for different energy levels that fulfil the condition of Structural Damage (SD) <admissible Structural Damage (ADL), not all values are viable.
b. As already mentioned, each energy level has a Visual Damage (VD) scatter associated to it (see Bounding-box Approach); hence a range of Visual Damage (VD) [$VD_{min}$, $VD_{max}$] can be predicted for each energy level.
c. Hence, each energy level has an admissible Visual Damage ($VD_{ADL}$) and minimum Visual Damage ($VD_{min}$) associated to it. See FIG. 8.
d. The admissible Visual Damage ($VD_{ADL}$) corresponding to a specific energy level can be greater than the minimum Visual Damage ($VD_{min}$) of higher energy levels, which implies that Structural Damage (SD) higher than the admissible Structural Damage (ADL) could be found for Visual Damage (VD) lower than admissible Visual Damage ($VD_{ADL}$). See FIG. 7b. Contrary to admissible Visual Damage ($VD_{ADL}$), minimum Visual Damage ($VD_{min}$) does not always follow a monotonically increasing relationship with the energy (see FIG. 9), reason why this circumstance can occur.

Therefore, taking into account (a) the relationship between the Visual Damage-Structural Damage (VD-SD) with the admissible structural damage (ADL) and (b) the Visual Damage (VD) relationship with the energy, the following condition shall be met:

$$VD_{ADL}* \leq VD_{min} \forall VD_{min}/e>e* \qquad [1]$$

being e* the highest energy level included in the calculations and $VD_{ADL}*$ its associated admissible visual damage. This condition assures that there will be no Structural Damages (SD) higher than the admissible Structural Damage (ADL) for Visual Damages (VD) lower than the admissible Structural Damage* ($VD_{ADL*}$).

Figure 9A:
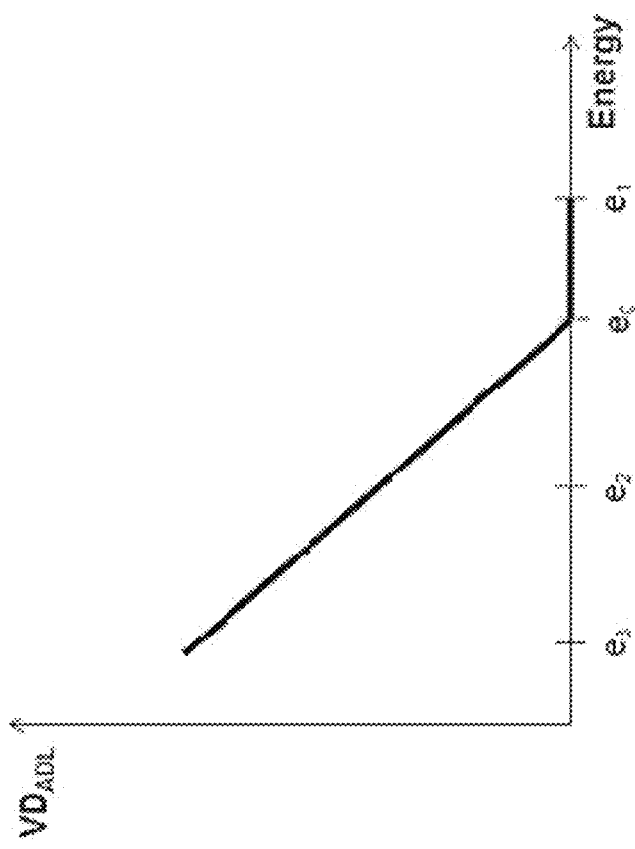
FIGS. 9a and 9b show graphics depicting the relationships admissible Visual Damage-energy ($VD_{ADL}$-energy) and minimum Visual Damage-energy ($VD_{m,n}$-energy), respectively.
Figure 9B:
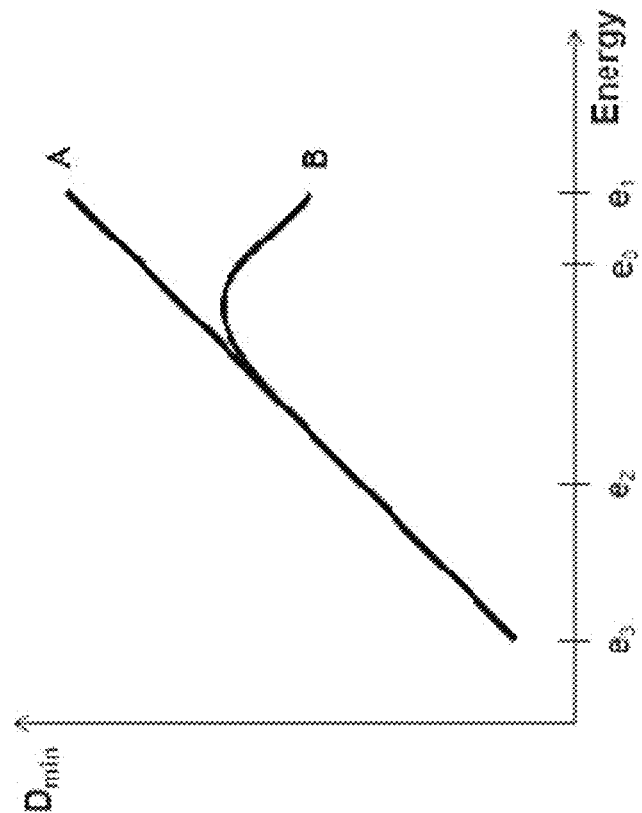

It is possible to set the relationship between admissible Visual Damage ($VD_{ADL}$) and the energy level e, as well as between the minimum Visual Damage ($VD_{min}$) and the energy level e, see FIG. 9. The admissible Visual Damage ($VD_{ADL}$) follows a monotonically decreasing function. The minimum Visual Damage ($VD_{min}$) follows a monotonically increasing relationship with the energy e, up to an energy level where, depending on several parameters, it may or may not continue following a monotonically increasing relationship.

Figure 10A:
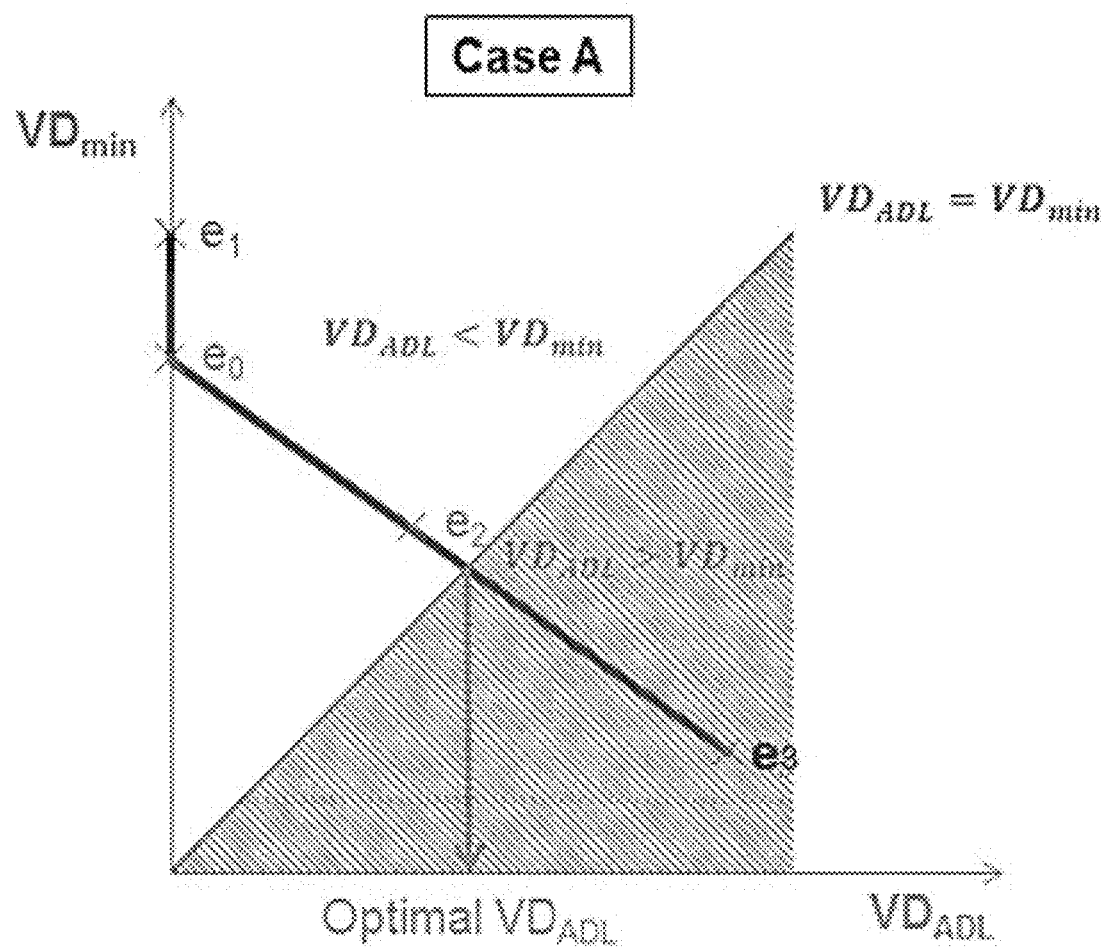
FIGS. 10A to 10C shows three graphics depicting minimum Visual Damage-admissible Visual Damage (VDmin-VDADL) relationship. If the minimum Visual Damage (VDmin) monotonically increases with the energy level, case A is applicable; if the minimum Visual Damage (VDmin) does not monotonically increase with the energy, case B1 and B2 are applicable.
Figure 10B:
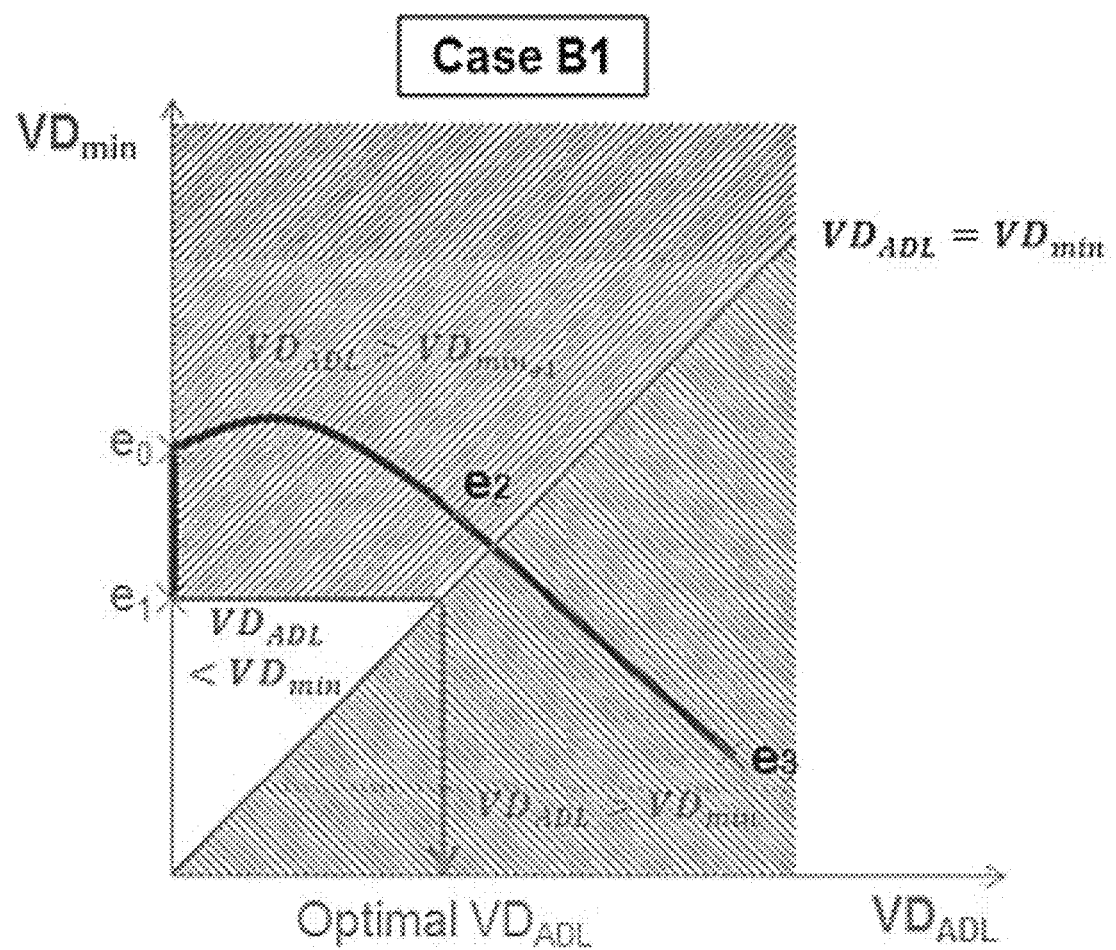
Figure 10C:
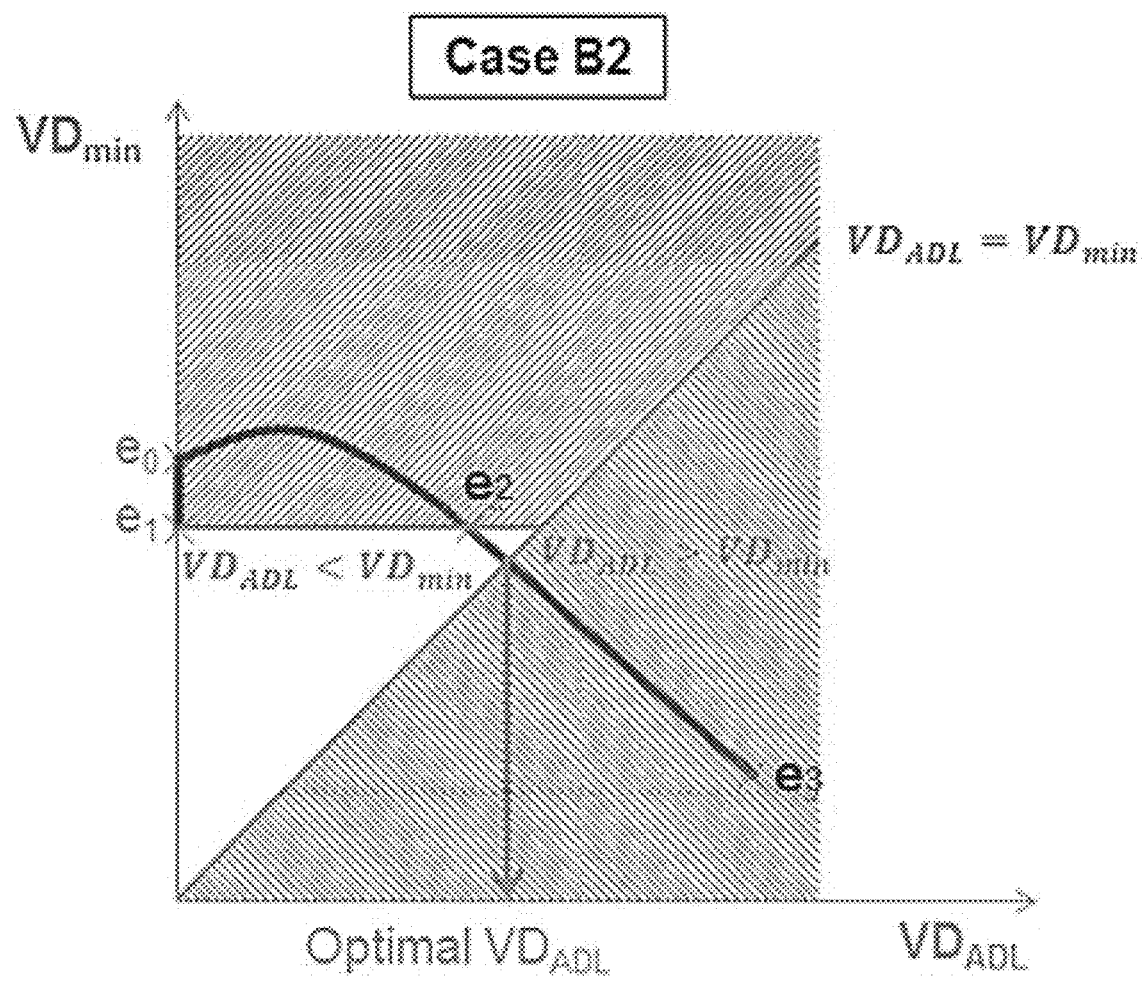

Making use of the aforementioned knowledge, a relationship between the minimum Visual Damage (VDmin) and the admissible Visual Damage (VDADL) can be established, which allows to determine the optimal admissible Visual Damage (VDADL), i.e., the maximum admissible Visual Damage (VDADL) that fulfills condition [1], see FIGS. 10A to 10C. Going back to the relationship maximum admissible Visual Damage-energy (VDADL-e), the maximum energy level at which it should be tested can be determined.

Therefore, to determine the energies at which it should be tested, these steps need to be followed:
1) Calculate the admissible Visual Damage ($VD_{ADL}$) and minimum Visual Damage ($VD_{min}$) estimates for different energy levels using data from previous test campaigns/real damages.

2) Find out the relationship between the admissible Visual Damage ($VD_{ADL}$) and the energy levels, as well as between the minimum Visual Damage ($VD_{min}$) and the energy levels.
3) Relate admissible Visual Damage ($VD_{ADL}$) and minimum Visual Damage ($VD_{min}$) to find the optimal admissible Visual Damage ($VD_{ADL}*$), $VD_{ADL}* \leq VD_{min} \forall VD_{min}/e > e*$.
4) Find out the energy level that corresponds to the optimal admissible Visual Damage ($VD_{ADL}*$) using the relationship found in step 2.

Figure 11:
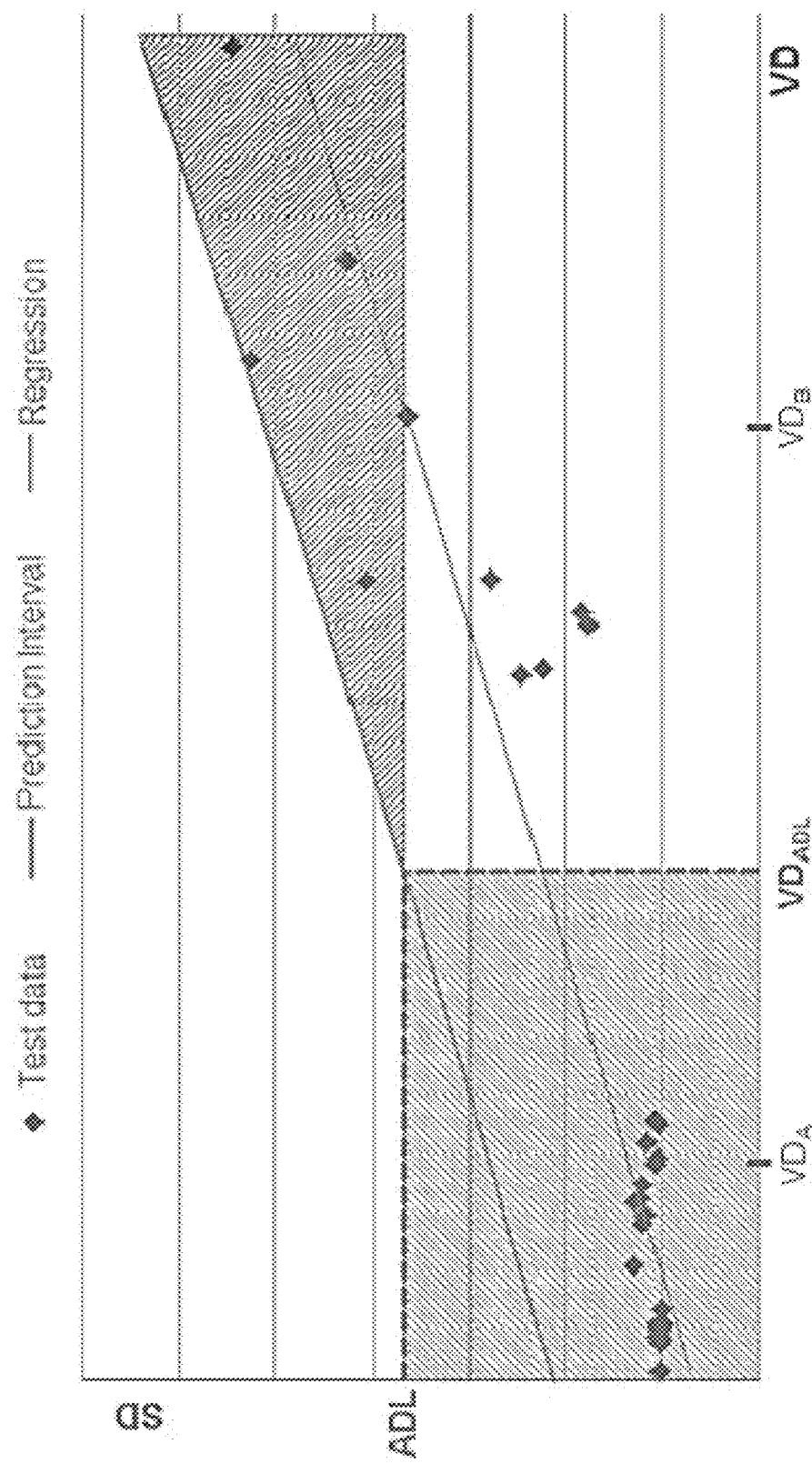
FIG. 11 shows a graphic depicting the relationship Structural Damage-Visual Damage (SD-VD) found using the method called "Energy-Dependent Approach".

Once the maximum energy to test is obtained, the next steps need to be followed to empirically validate the estimated admissible Visual Damage ($VD_{ADL}$):

1) Obtain data by testing at least two, recommended three or more, close energy levels. The higher the number of specimens, the smaller prediction intervals.
2) Find the best suitable regression to relate the visual damage (VD) and the structural damage (SD), being the visual damage (VD) the independent variable and the structural damage (SD) the dependent one (SD=f(VD)). This regression can be linear or non-linear, depending on the specific case (e.g., depending on the material and lightning surface protection).
3) The prediction interval is calculated taking into account the number of specimens, the degree of confidence, the quality of the adjustment and the data dispersion by using existing mathematical methods found in the literature.
4) Determine the allowable visual damage ($VD_{ADL}$), which corresponds to the intersection between the admissible Structural Damage (ADL) and the structural damage (SD) prediction interval. This intersection defines a safe area where it is assured that no structural damage (SD) higher than the admissible Structural Damage (ADL) will be encountered for a Visual Damage (VD) lower than the admissible Visual Damage ($VD_{ADL}$), see FIG. 11.

The invention claimed is:

1. A method for inspecting for structural damage on a skin of an aircraft after a lightning strike, the skin comprising a set of marks derived from the lightning strike, said marks comprising Visual Damage (VD) indicated by removed paint of the skin and Structural Damage (SD), wherein the aircraft is divided into different zones, wherein each of the zones corresponds to a different probability of receiving a lightning strike and wherein each of the zones is assigned a maximum expected level of energy of the lightning strike, wherein the method comprises the following steps:
for each of the marks, measuring an area of paint removed by the lightning strike,
for each of the marks, comparing the measured area with an area threshold value, wherein the threshold value is related to the Structural Damage (SD) of the mark and is obtained by the following steps:
sorting empirical data of Structural Damage (SD) versus Visual Damage (VD) for different levels of energy or peak currents of the lightning strike, the levels of energy or peak currents are below a maximum energy or peak current expected for the zone in which the mark is located,
providing an admissible Structural Damage (ADL) for the zone in which the mark is located, and
calculating an admissible Visual Damage ($VD_{ADL}$) corresponding to a maximum Structural Damage (SD) that can be encountered is less than the admissible Structural Damage (ADL) for the aircraft zone in which the mark is located, said admissible Visual Damage ($VD_{ADL}$) being the area threshold value, and
notifying as unnecessary non-destructive testing of the mark, for each of the marks determined by the comparison to have a measured area less than the area threshold value.

2. The method according to claim 1, wherein if the Structural Damage (SD) for the maximum expected level of energy or peak current of the lightning strike in the aircraft zone in which the mark is located is less than the admissible Structural Damage (ADL), the maximum energy level expected at the aircraft zone in which the mark is located is taken for calculating the admissible Visual Damage ($VD_{ADL}$).

3. The method according to claim 2, wherein the step of calculating the admissible Visual Damage ($VD_{ADL}$) includes:
calculating, for the maximum energy level expected, a confidence interval for both the Visual Damage (VD) and the Structural Damage (SD), independently, and
taking the maximum Visual Damage ($VD_{max}$) of the confidence interval as the admissible Visual Damage ($VD_{ADL}$).

4. The method according to claim 1, wherein if the Structural Damage (SD) for the maximum expected level of energy or peak current of the lightning strike in the aircraft zone in which the mark is located is greater than the admissible Structural Damage (ADL), a model of the Structural Damage-Visual Damage (SD-VD) relationship across different energy levels is calculated.

5. The method according to claim 4, wherein the step of calculating the admissible Visual Damage ($VD_{ADL}$) includes:
calculating from empirical data the admissible Visual Damage ($VD_{ADL}$) and the minimum Visual Damage ($VD_{min}$) for each of the different energy levels;
determining a relationship between the admissible Visual Damage ($VD_{ADL}$) and the energy levels, and between the minimum Visual Damage ($VD_{min}$) and the energy levels,
determining an optimal admissible Visual Damage ($VD_{ADL}*$), according to, $$VD_{ADL}* \leq VD_{min} \forall VD_{min}/e > e*,$$

selecting one of the different levels of energy that corresponds to the optimal admissible Visual Damage ($VD_{ADL}*$) from the relationship between the admissible Visual Damage ($VD_{ADL}$) and the energy levels, and
validating the estimated admissible Visual Damage ($VD_{ADL}$) by relating Visual Damage (VD) and Structural Damage (SD), and calculating the prediction interval for Structural Damage (SD).

6. The method according to claim 1, wherein the step of comparing the measured area of the mark with the area threshold value is performed by a device comprising an area equal to the area threshold value ($VD_{ADL}$) and includes locating the device over the mark.

7. A method for inspecting for structural damage on a skin of an aircraft due to a lightning strike, wherein the lighting strike has caused visual damage to the skin and may have caused structural damage below the skin, wherein the method comprises:
measuring an area of the visual damage on the skin;
determining which zone of the aircraft includes the visual damage, wherein the zone is one of a plurality of zones on the skin of the aircraft, and each of the zones is assigned a maximum expected level of energy or peak currents of a lightning strike to the zone;

comparing the measured area for the mark with an area threshold value, wherein the area threshold value is determined by:

sorting empirical data relating structural damage with visual damage for different levels of energy or peak currents of a lightning strike to the skin, wherein the levels of energy or peak currents are below the maximum energy or peak current expected for the zone in which the mark is located, determining a maximum structural damage of the aircraft that can be tolerated in the zone in which the mark is located, determining an admissible visual damage corresponding to the maximum structural damage, and determining the area threshold value based on the admissible visual damage, and notifying as unnecessary non-destructive testing of the mark, for each of the marks determined by the comparison to have a measured area less than the area threshold value.

8. The method of claim 7 wherein the area of the visual damage is measured by measuring an area of paint removed from the skin by the lighting strike.

9. The method of claim 7 further comprising determining that no further inspection of the visual damage to the aircraft is needed if the measured area of the mark is less than the area threshold value.

10. The method of claim 7 further comprising determining that a further inspection of the visual damage to the aircraft is needed if the measured area of the mark is at least as large as the area threshold value.

11. A method to make a collection of inspection devices for use in inspecting for structural damage on a skin of an aircraft due to a lightning strike, wherein the device has a surface area corresponding to an area threshold value, and the method includes:

defining zones of the aircraft, wherein each of the zones is a different region of the aircraft and each zone has a corresponding maximum acceptable level of energy from a lighting strike in the zone;

for each of the zones, determining a maximum tolerable structural damage to the aircraft due to a lighting strike in the zone;

for each of the zones, determining an admissible visual damage due to a lighting strike, wherein the admissible visual damage corresponds to the maximum tolerable structural damage in the zone and the admissible damage is determined from empirical data of lighting strikes to the zone, wherein the empirical data correlates visual damage to structural damage due to lighting strikes in the zone for different levels of energy or peak currents of a lightning strike, for each of the zones, determining the area threshold value based on the admissible visual damage, for each of the zones, making the inspection device to have an area corresponding to the area threshold valve, wherein the inspection devices for all of the zones is included in the collection of inspection devices.

* * * * *